United States Patent Office 3,096,177
Patented July 2, 1963

3,096,177
PROCESS FOR THE MANUFACTURE OF A SYNTHETIC YOGHURT FROM SOYBEAN
Hisashi Ariyama, 301 Nippon Jutakukodan, Apt.-House, 5th Bldg., No. 75–1, Biwakubi-cho, Sendai-shi, Japan
No Drawing. Filed Aug. 31, 1960, Ser. No. 53,044
Claims priority, application Japan Sept. 7, 1959
6 Claims. (Cl. 99—59)

This invention relates to a process for the manufacture of a synthetic yoghurt from soybeans.

One object of this invention is to provide a synthetic yoghurt which shows tougher curd and slighter separation of serum and has finer savour than the product obtained from soybeans by grinding the same merely in water.

Another object of this invention is to provide a synthetic yoghurt being three times higher in protein content, six times higher in minerals content and four times higher in lecithin content than the ordinary yoghurt made from milk.

Still another, and more specific, object of this invention is to provide a synthetic yoghurt having a much higher nutritive value than the ordinary milk yoghurt.

In accordance with this inventiion, washed soybeans are steamed for 25 to 30 minutes and soaked for one hour in either 0.1 or 0.2% caustic soda solution. Then the skin of the soybeans is removed and the soybeans are soaked again in the caustic soda solution which was used in preceding step for 4 to 5 hours. Thus treated soybeans are then ground with said caustic soda solution and filtered. The resultant filtrate is neutralized with hydrochloric acid or citric acid, adjusting pH of the solution at 6.8 to 7.0 and then about 75 g. of sugar (as cane sugar) is added to 500 ml. of said adjusted filtrate is added. Then the solution is boiled, agitating the same, continuously for about 5 minutes and after it is cooled suitable the cooled solution is inoculated with *Lactobacillus bulgaricus*. The whole solution is incubated at a temperature of 37° to 43° C. for 4 to 6 hours until the protein which has been extracted for soybean and dissolved in the solution coagulates.

Industrially, a synthetic yoghurt may be manufactured in the following manner:

Washed soybeans are soaked in water and steamed for a few minutes. Then they are soaked in 0.1 or 0.2% caustic soda solution for a short time. By these treatments the skin of the beans can be easily removed. The skinned beans are soaked again in the caustic soda solution which was used in the preceding step for 4 to 5 hours, ground with said caustic soda solution and filtered. The resultant filtrate contains much more protein than that solution produced by the ordinary method i.e. by grinding soybean merely in water. Subsequently, hydrochloric acid or citric acid is added to the filtrate, its pH being adjusted to 7.0, and about 75 g. of sugar is added to 500 ml. of said filtrate thereto. The resultant solution is boiled for about 5 minutes and, after cooling, suitable amount of milk yoghurt is added thereto or the solution is inoculated with *Lactobacillus bulgaricus*. The whole solution, if necessary, after an essence is added thereto, is kept at a temperature of 37° to 43° C. for 4 to 6 hours until the protein which has been extracted from soybean and dissolved in the solution coagulates and the solution clots as a whole.

EXAMPLE

Well selected soybeans were steamed for 25 to 30 minutes and soaked in 24 liters of 0.1% caustic soda solution for one hour. The beans were taken out and skinned using a mixer equipped with rotary blades. The skinned beans were again soaked for 4 to 5 hours in the caustic soda solution which was used in the preceding step and ground with the caustic soda solution by means of a suitable grinder. The whole solution was filtered through a cloth bag under pressure, yielding 18 liters of remarkably concentrated proteinaceous solution. To the resultant solution, any of hydrochloric acid, or citric acid was added, adjusting the pH to 7.0. 75 g. of cane sugar was added to 500 ml. of this neutralized solution which was then boiled for 5 minutes with continuous agitation. After cooling, 10 ml. of ordinary milk yoghurt or a suitable amount of *Lactobacillus bulgaricus* was added as a starter and then 20 to 40 drops of lemon or orange essence were added thereto. The whole solution was agitated slowly, homogenized, then transferred into sterilized containers and kept at a temperature of 37 to 43° C. for 4 to 6 hours, yielding a final product.

The constituents of the product are shown in the following table:

Table I

|  | Ordinary milk yoghurt, percent | A synthetic yoghurt made from soybean by the process of the above-mentioned example, percent |
|---|---|---|
| Water | 94.2 | 76.9 |
| Crude protein | 3.4 | 9.8 |
| Fat | 1.1 | 0.4 |
| Carbohydrate | [1] 10.6 | [2] 8.6 |
| Minerals | 0.7 | 4.3 |
| Phosphatide (lecithin) | 0.0062 | 0.024 |

[1] Lactose and sucrose.
[2] Mainly sucrose.

As stated hereinbefore, it may be seen that protein, mineral, and lecithin contents of my synthetic yoghurt are three times, six times, and four times of those of ordinary milk yoghurt, respectively.

It should be noted as a characteristic and an important part of this invention that caustic soda is used as a protein solvent. An experimental data on the rate of extraction of soybean protein with caustic soda solution will be indicated as follows:

Table II

| Solvent | Specific gravity of the extract | Protein content of the extract |
|---|---|---|
| Water | 1.016 | 2.09 |
| 0.05% NaOH sol | 1.020 | 4.21 |
| 0.1% NaOH sol | 1.025 | 7.43 |
| 0.2% NaOH sol | 1.026 | 7.60 |

As shown in the above table, 0.1% caustic soda solution is most suitable for extracting protein from an economical point and easiness in practice.

Although I have shown and described a certain specific embodiment of my invention, I am fully aware that many modifications thereof are possible. My invention, therefore, is not to be restricted except insofar as is necessitated by the prior art or by the spirit of the appended claims.

What is claimed as new and desired to be secured by Letters Patent of the United States is:

1. A process for the manufacture of a synthetic yoghurt product, comprising steps of steaming washed soybeans for 25 to 30 minutes, soaking said soybeans in 0.1–0.2% caustic soda solution for one hour, skinning said soaked soybeans, soaking said skinned soybeans in 0.1–0.2% caustic soda solution for 4 to 5 hours, grinding said soaked soybeans with the same caustic soda solution, filtering said ground soybeans, adjusting pH of said filtrate to 7.0 by adding hydrochloric acid, adding about 75 grams of sugar per 500 ml. of said adjusted filtrate, boiling said filtrate for about 5 minutes with continuous agitation, cooling said boiled filtrate, inoculating said cooled filtrate with *Lactobacillus bulgaricus*, and incubating said inoculated filtrate at a temperature of 37° to 43° C. for four to six hours.

2. A process for the manufacture of a synthetic yoghurt product, comprising steps of steaming washed soybeans for 25 to 30 minutes, soaking said soybeans in 0.1–0.2% caustic soda solution for one hour, skinning said soaked soybeans, soaking said skinned soybeans in 0.2% caustic soda solution for 4 to 5 hours, grinding said soaked soybeans with the same caustic soda solution, filtering said ground soybeans, adjusting pH of said filtrate to 7.0 by adding citric acid, adding about 75 grams of sugar per 500 ml. of said adjusted filtrate, boiling said filtrate for about 5 minutes with continuous agitation, cooling said boiled filtrate, adding milk yoghurt to said cooled filtrate, and incubating said added filtrate at a temperature of 37° to 43° C. for four to six hours.

3. A process for the manufacture of a synthetic yoghurt product comprising steaming soybeans, soaking said soybeans in 0.1% aqueous caustic soda solution, skinning said cooked soybeans, soaking said skinned soybeans in a 0.1% aqueous caustic soda solution for 4 to 5 hours, grinding said soaked soybeans with the same caustic soda solution, filtering said ground soybeans, adjusting the pH of the filtrate to 7.0 by adding an acid selected from the group consisting of hydrochloric acid and citric acid, adding about 75 grams of sugar per 500 ml. of said adjusted filtrate, thereafter boiling said filtrate with continuous agitation, cooling said boiled filtrate, inoculating said cooled filtrate with *Lactobacillus bulgaricus* and incubating said inoculated filtrate at a temperature of 37° to 43° C. for four to six hours.

4. A process for the manufacture of a synthetic yoghurt product as claimed in claim 3, wherein the acid which is used for adjusting pH of the filtrate of ground soybean is hydrochloric acid.

5. A process for the manufacture of a synthetic yoghurt product as claimed in claim 3, wherein the acid which is used for adjusting pH of the filtrate of ground soybean is citric acid.

6. A process for the manufacture of a synthetic yoghurt product, comprising steaming soybeans, soaking said soybeans in 0.2% caustic soda solution, skinning said soaked soybeans, soaking said skinned soybeans in a 0.2% aqueous caustic soda solution for 4 to 5 hours, grinding said soaked soybeans with the same caustic soda solution, filtering said ground soybeans, adjusting the pH of the filtrate to 7.0 by adding an acid selected from the group consisting of hydrochloric and citric acid, adding about 75 grams of sugar per 500 ml. of said adjusted filtrate, thereafter boiling said filtrate with continuous agitation, cooling said boiled filtrate, adding milk yoghurt to said cooled filtrate and incubating said added filtrate at a temperature of 37° to 43° C. for four to six hours.

References Cited in the file of this patent

UNITED STATES PATENTS

| 1,064,841 | Li | June 17, 1913 |
| 1,243,855 | Melbuish | Oct. 23, 1917 |
| 1,955,375 | Cone et al. | Apr. 17, 1934 |
| 2,329,080 | Raymond | Sept. 7, 1943 |

OTHER REFERENCES

Niwa, Katayoma, and Suzuki, "Preparation of Soybean Milk," Chem. Abstracts, vol. 50, 1956, p. 17246f.